United States Patent
Uchida

(10) Patent No.: US 9,497,193 B2
(45) Date of Patent: Nov. 15, 2016

(54) REMOTE OPERATION SYSTEM, RELAY DEVICE, COMMUNICATION DEVICE, AND REMOTE OPERATION METHOD

(75) Inventor: Kaoru Uchida, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 13/977,765

(22) PCT Filed: Nov. 16, 2011

(86) PCT No.: PCT/JP2011/006393
§ 371 (c)(1),
(2), (4) Date: Jul. 1, 2013

(87) PCT Pub. No.: WO2012/095918
PCT Pub. Date: Jul. 19, 2012

(65) Prior Publication Data
US 2013/0283399 A1    Oct. 24, 2013

(30) Foreign Application Priority Data
Jan. 14, 2011  (JP) ................................ 2011-005470

(51) Int. Cl.
*H04L 29/06* (2006.01)
*H04L 29/08* (2006.01)
(Continued)

(52) U.S. Cl.
CPC .......... *H04L 63/10* (2013.01); *H04L 41/0813* (2013.01); *H04L 67/025* (2013.01); *H04L 67/28* (2013.01); *H04W 12/08* (2013.01)

(58) Field of Classification Search
CPC .. H04L 141/28; H04W 12/06; H04W 12/08; G06F 21/44; G06F 21/121; G06F 21/305
See application file for complete search history.

(56) References Cited

U.S. PATENT DOCUMENTS

| 6,970,698 B2 * | 11/2005 | Majmundar | H04W 4/06 340/7.29 |
| 7,463,884 B2 * | 12/2008 | Majmundar | H04W 4/06 379/56.3 |

(Continued)

FOREIGN PATENT DOCUMENTS

| CN | 101212688 A | 7/2008 |
| JP | 2002-232970 A | 8/2002 |

(Continued)

OTHER PUBLICATIONS

Communication dated Nov. 15, 2014 from the State Intellectual Property Office of the People's Republic of China in counterpart application No. 201180064996.7.

(Continued)

*Primary Examiner* — Izunna Okeke
*Assistant Examiner* — Hee Song
(74) *Attorney, Agent, or Firm* — Sughrue Mion, PLLC

(57) ABSTRACT

There is provided a remote operation system, a relay device, a communication device, and a remote operation method which are capable of executing collective remote operations. The remote operation system includes communication devices, an external device that specifies at least one communication device as a target of a remote operation among the communication devices, and accepts an input of a remote operation content to be executed for the specified communication device, and a relay unit for relaying communication between the specified communication devices and the external device. The relay unit includes a storage unit for storing the remote operation content accepted by the external device, and a notification unit for notifying the specified communication device of the remote operation content.

18 Claims, 9 Drawing Sheets

(51) Int. Cl.
*H04L 12/24* (2006.01)
*H04W 12/08* (2009.01)

(56) References Cited

U.S. PATENT DOCUMENTS

| | | | | |
|---|---|---|---|---|
| 8,340,633 | B1* | 12/2012 | Rege | H04W 4/26 455/405 |
| 2005/0260973 | A1* | 11/2005 | van de Groenendaal | H04L 63/102 455/411 |
| 2007/0257982 | A1* | 11/2007 | Luo | H04M 1/72533 348/14.05 |
| 2009/0203352 | A1* | 8/2009 | Fordon et al. | 455/406 |
| 2010/0130178 | A1* | 5/2010 | Bennett et al. | 455/414.1 |
| 2010/0192212 | A1* | 7/2010 | Raleigh | G06Q 10/06375 726/7 |
| 2010/0274941 | A1* | 10/2010 | Wolfe | 710/269 |
| 2011/0009107 | A1* | 1/2011 | Guba | G08G 1/20 455/418 |
| 2011/0072509 | A1* | 3/2011 | Mohanty | H04W 4/00 726/17 |
| 2011/0252240 | A1* | 10/2011 | Freedman | H04L 63/02 713/169 |
| 2011/0319056 | A1* | 12/2011 | Toy | H04W 12/06 455/412.2 |
| 2012/0131570 | A1* | 5/2012 | Kaikkonen | H04M 1/72544 717/177 |
| 2013/0145024 | A1* | 6/2013 | Cao | H04L 67/22 709/224 |

FOREIGN PATENT DOCUMENTS

| | | | | |
|---|---|---|---|---|
| JP | 2003-153351 | A | 5/2003 | |
| JP | 2004-80395 | A | 3/2004 | |
| JP | 2005198099 | * | 6/2005 | H04Q 9/00 |
| JP | 2005-198099 | A | 7/2005 | |
| JP | 2005-323254 | A | 11/2005 | |
| JP | 2007-134814 | A | 5/2007 | |
| JP | 2007-134843 | A | 5/2007 | |
| JP | 2007-195200 | A | 8/2007 | |
| JP | 2009-117918 | A | 5/2009 | |

OTHER PUBLICATIONS

International Search Report for PCT/JP2011/006393 dated Feb. 21, 2012.

* cited by examiner

REMOTE OPERATION SYSTEM, RELAY DEVICE, COMMUNICATION DEVICE, AND REMOTE OPERATION METHOD

CROSS REFERENCE TO RELATED APPLICATIONS

This application is a National Stage of International Application No. PCT/JP2011/006393 filed Nov. 16, 2011, claiming priority based on Japanese Patent Application No. 2011-005470 filed Jan. 14, 2011, the contents of all of which are incorporated herein by reference in their entirety.

TECHNICAL FIELD

The present invention relates to a remote operation system that enables operation of a communication device from an external device installed in a remote location.

BACKGROUND ART

As a technique that enables operation of a certain device from another device set in a remote location, a remote operation system, such as a remote desktop function of a personal computer, is known in which a personal computer at hand operates another personal computer connected via a network, for example.

Also known are remote operation systems that allow a personal computer or a mobile terminal to change a mail address of a mobile terminal located in a remote location or to turn on/off a power supply (Patent Literature 1, Patent Literature 2), and remote operation systems that allow a mobile terminal to control photographing with a camera of another mobile terminal (Patent Literature 3, Patent Literature 4). In addition, as a system for remotely operating functions of equipment, Patent Literature 5 discloses an equipment remote operation system that allows a mobile terminal to control operation of equipment via the Internet. The equipment disclosed in Patent Literature 5 includes an HTTP server which is activated at a preset time or at a predetermined time interval. A global IP address acquired from a provider server is written into an e-mail to be transmitted to a mobile terminal, and the HTTP server is then activated. On the other hand, the mobile terminal activates an HTTP browser and connects to the equipment according to the received global IP address. Then, the equipment performs an operation control according to a control request signal transmitted from the mobile terminal via the Internet.

CITATION LIST

Patent Literature

[Patent Literature 1] Japanese Unexamined Patent Application Publication No. 2005-198099

[Patent Literature 2] Japanese Unexamined Patent Application Publication No. 2009-117918

[Patent Literature 3] Japanese Unexamined Patent Application Publication No. 2007-195200

[Patent Literature 4] Japanese Unexamined Patent Application Publication No. 2005-323254

[Patent Literature 5] Japanese Unexamined Patent Application Publication No. 2003-153351

SUMMARY OF INVENTION

Technical Problem

Incidentally, each of the remote operation systems disclosed in the above-mentioned Patent Literatures 1 to 5 accesses a target equipment in real time and performs a remote operation. Meanwhile, there is a need that when an employee is on a business trip with a mobile terminal for business use, for example, an administrator of a company remotely accesses the mobile terminal for business use to manage the usage history or perform an operation for the management. There is another need that a person who is familiar with the operation of equipment (hereinafter referred to as "supporter") remotely accesses the equipment owned by a user who is not familiar with the operation, such as a senior user, and confirms the usage history or performs an operation necessary for maintenance for the user.

In the case of performing such a remote access, the remote operation is desirably performed during a time period, such as midnight or early morning, in which the actual owner of the equipment less likely to operate the equipment, so as to avoid conflict with the operation by the actual owner (for example, an employee on a business trip or a senior user) of the equipment. However, the remote operation systems disclosed in above-mentioned Patent Literatures 1 to 5 deal with only the real time operation. Accordingly, the person who performs a remote operation (for example, an administrator of a company, or a supporter) needs to work during a time period in which the operation as described above is less likely to be performed. For example, the remote operation such as the management of the usage history is generally a repetition of a predetermined operation in many cases, and it is troublesome to perform such an operation each time. Furthermore, in the remote operation systems disclosed in the above-mentioned Patent Literatures 1 to 5, a control to be performed if there is a conflict between the operation performed by the actual owner and the operation performed by the person who performs the remote operation is not taken into consideration.

The present invention provides a remote operation system and a remote operation method which solve the above-mentioned problems.

Solution to Problem

A remote operation system according to a first exemplary aspect of the present invention includes: communication devices; an external device that specifies at least one communication device as a target for a remote operation among the communication devices, and accepts an input of a remote operation content to be executed for the specified communication device; and relay means for relaying communication between the specified communication device and the external device. The relay means includes: storage means for storing the remote operation content accepted by the external device; and notification means for notifying the specified communication device of the remote operation content.

A relay device according to a second exemplary aspect of the present invention includes means for relaying communication between communication devices and an external device that specifies at least one communication device as a target for a remote operation among the communication devices and accepts an input of a remote operation content to be executed for the specified communication device; storage means for storing the remote operation content accepted by the external device; and notification means for notifying the specified communication device of the remote operation content.

A communication device according to a third exemplary aspect of the present invention includes: an internal function processing unit; and an access management unit that detects whether an access authorization function is activated, accepts a remote operation from an external device when the access authorization function is activated, and causes the internal function processing unit to operate. The access management unit causes the internal function processing unit to operate according to a remote operation content preliminarily input from the external device.

A remote operation method according to a fourth exemplary aspect of the present invention is a remote operation method in a remote operation system including communication devices; an external device that accepts an input of a remote operation content to be executed for the communication devices; and a relay device that relays communication between a specified communication device and the external device, the remote operation method including the steps of: specifying, in the external device, at least one communication device as a target for a remote operation among the communication devices, and accepting an input of a remote operation content to be execute for the specified communication device; and storing, in the relay device, the remote operation content accepted by the external device, and notifying the specified communication device of the remote operation content.

Advantageous Effects of Invention

According to the present invention, it is possible to provide a remote operation system, a relay device, a communication device, and a remote operation method which are capable of executing collective remote operations.

DESCRIPTION OF EMBODIMENTS

First Exemplary Embodiment

In the following exemplary embodiments and examples, an operated terminal which is remotely operated is referred to as "communication device", and an operating terminal which remotely operates the communication device is referred to as "external device".

Figure 1:
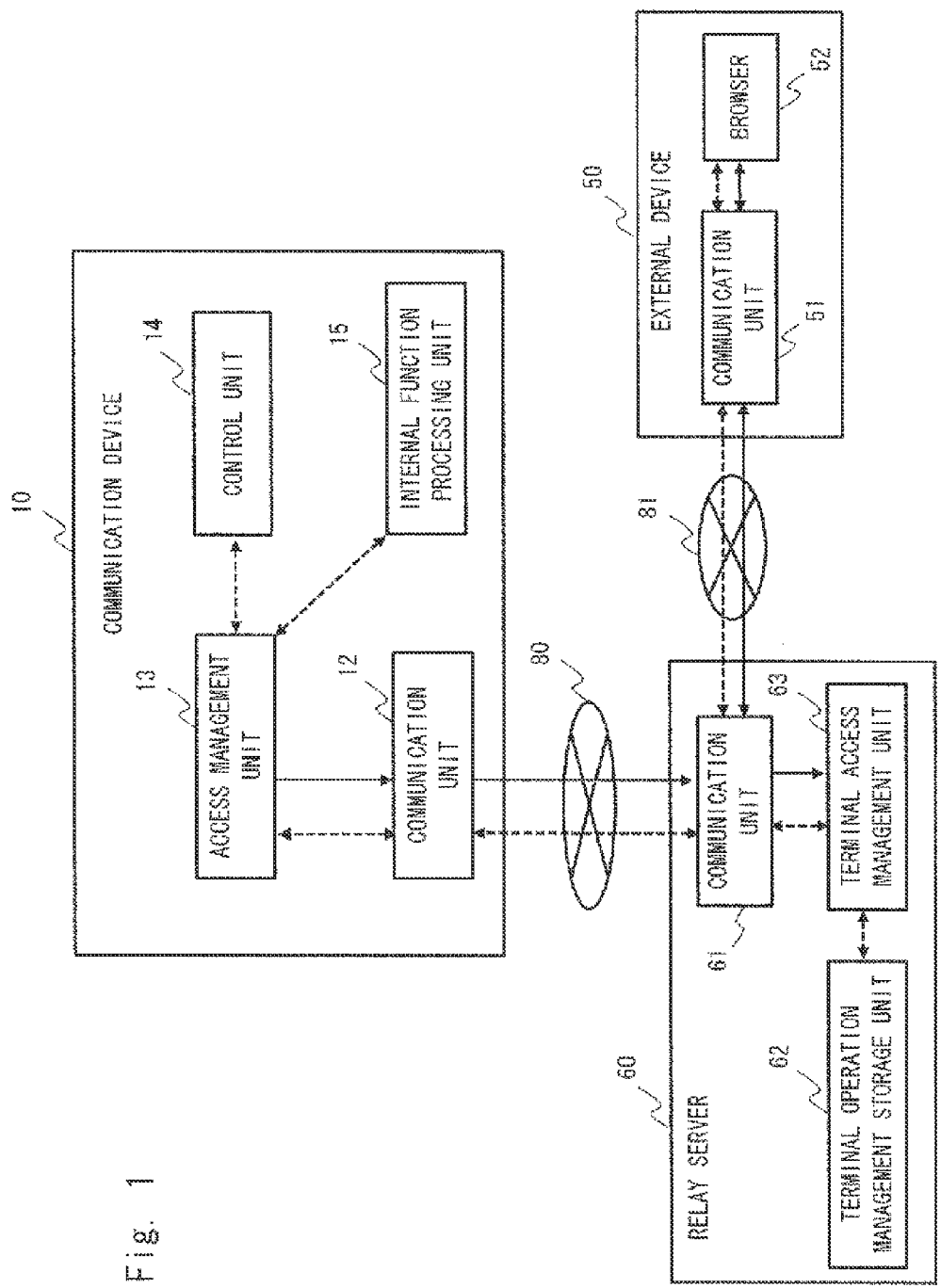
FIG. 1 is a configuration diagram of a remote system according to a first exemplary embodiment.

FIG. 1 shows a configuration example of a remote operation system according to this exemplary embodiment. The remote operation system shown in FIG. 1 includes a communication device 10, an external device 50 that accepts an input of a remote operation to be executed for the communication device 10, and a relay server 60 that relays communication between the communication device 10 and the external device 50. The relay server 60 is a remote operation system that stores the contents of the remote operation for the communication device 10, which are received from the external device 50. Note that in this figure, basically, each solid line represents a flow of operated data and each dashed line represents a flow of control system data. This holds true for the subsequent figures.

The remote operation herein described includes various remote operations for the communication device, such as performing an input operation on the communication device in a remote location; monitoring a display screen of the communication device in the remote location; changing settings of the communication device in the remote location; transferring data to a memory of the communication device in the remote location; and extracting data from the communication device in the remote location.

The communication device is, for example, a mobile phone terminal, a smartphone terminal, consumer electronics equipment, or a personal computer. The communication device is a device including at least a function for communicating with another equipment, and may include input devices such as an operation button, a touch panel, a mouse, a keyboard, a microphone, and a camera, and output devices such as a display and a speaker. The external device is, for example, a mobile phone terminal, a smartphone terminal, or a personal computer. The external device is a device which includes at least a communication function and generally includes input devices as described above. The external device may include output devices as described above. The relay server is generally composed of a typical computer.

The communication device 10 and the relay server 60 are connected via a network 80, and the external device 50 and the relay server 60 are connected via a network 81. The networks 80 and 81 include a function for establishing a communication via a wireless network provided by a mobile communication carrier, i.e., a so-called public telecommunication network, and a communication function using WiFi (Wireless Fidelity) for establishing a wireless LAN communication, for example.

The communication device 10 includes a communication unit 12, an access management unit 13, a control unit 14, and an internal function processing unit 15. The communication device 10 communicates with the relay server 60 via the network 80.

The communication unit 12 transmits and receives data to and from the relay server 60 via the network 80. The communication unit 12 transmits and receives data using communication standards which are determined between the communication unit 12 and the network 80. The communication unit 12 may be incorporated in the communication device 10, or may be attached to the communication device 10 by means of a network card or the like. The network 80 is composed of a public internet line, an IP network constructed by a carrier, or the like.

When there is a remote operation for the communication device 10 from the external device 50 via the communication unit 12, the access management unit 13 determines whether or not to accept the remote operation. In this case, when an access authorization function is in an activated state, the access management unit 13 accepts the remote operation and causes the internal function processing unit 15 of the communication device 10 corresponding to the remote operation to operate. When the access authorization function is in a deactivated state, the access management unit does not accept the remote operation. The access management unit 13 generates an activation timing of the access authorization function, and activates the access authorization function according to the activation timing. For example, the activation timing may be generated based on information input by a user who operates the communication device 10 by using the input device, simultaneously with the input, or may be generated at a predetermined time. Alternatively, the activation timing may be automatically generated at a predetermined time which is periodically determined and has a certain width, such as five minutes or one hour, from a predetermined event, for example, at the time of inputting information using the input device by the user, at the time of activating the previous access authorization function, or at the time of deactivating the previous access authorization function. The activation timing may be generated based not only on the information input by the user who directly operates the communication device 10, but also on information input by an operator of the device that remotely operates the communication device 10, i.e., the external device 50.

The control unit 14 controls the overall operation of the communication device 10 and is implemented by a CPU (Central Processing Unit), an MPU (Micro Processing Unit), or the like.

The internal function processing unit 15 manages every function (for example, a GPS function and a camera function) among the functions mounted in the communication device 10, except the above-mentioned functions of the communication unit 12, the access management unit 13, and the control unit 14. The internal function processing unit 15 may be implemented singly by the control unit 14, may be implemented in cooperation with the control unit 14 and other function units, or may be implemented independently of the control unit 14.

The external device 50 is a device which is used to remotely operate the communication device 10 via the network 81. In this case, the external device 50 and the network 81 may communicate with each other wirelessly or by wire. The external device 50 includes a communication unit 51 and a browser 52. The user who operates the external device 50 launches the browser 52 and inputs a remote operation content for the communication device 10 by using the input device. The remote operation content is, for example, a content indicating that "a positional information history of the communication device 10 which is obtained every 15 minutes in the past 24 hours is read out from the communication device 10 to the relay server 60 and transmitted to the external device 50". The input information about the remote operation is transmitted to the relay server 60 via the communication unit 51 and the network 81. The user who operates the external device 50 may input the remote operation content by direct operation using the input device provided to the external device 50, or may log in to the external device 50 via the network and launch the browser 52 to input the remote operation content.

The relay server 60 includes a communication unit 61, a terminal operation management storage unit 62, and a terminal access management unit 63. The communication unit 61 communicates with the communication unit 12 in the communication device 10 via the network 80, and communicates with the communication unit 51 in the external device 50 via the network 81. The relay server 60 relays the remote operation for the communication device 10 by the external device 50.

The terminal operation management storage unit 62 holds the remote operation content for the communication device 10 which is notified from the external device 50. The terminal access management unit 63 reads out the operation content registered in the terminal operation management storage unit 62, sets the operation content in an HTTP message, and transmits it to the communication device 10 via the communication unit 61. As a timing for transmitting the HTTP message, a timing when a notification of power-on (ready to accept the remote operation), for example, is sent from the communication device 10 may be set. This makes it possible to carry out the remote operation at the convenience of the user of the communication device 10. A certain interval set to the relay server by a timer or the like may also be used as the timing. This allows the relay server 60 to periodically access the communication device 10 even if the user of the communication device 10 forgets to notify the relay server 60 that it is ready to accept the remote operation.

Figure 2:
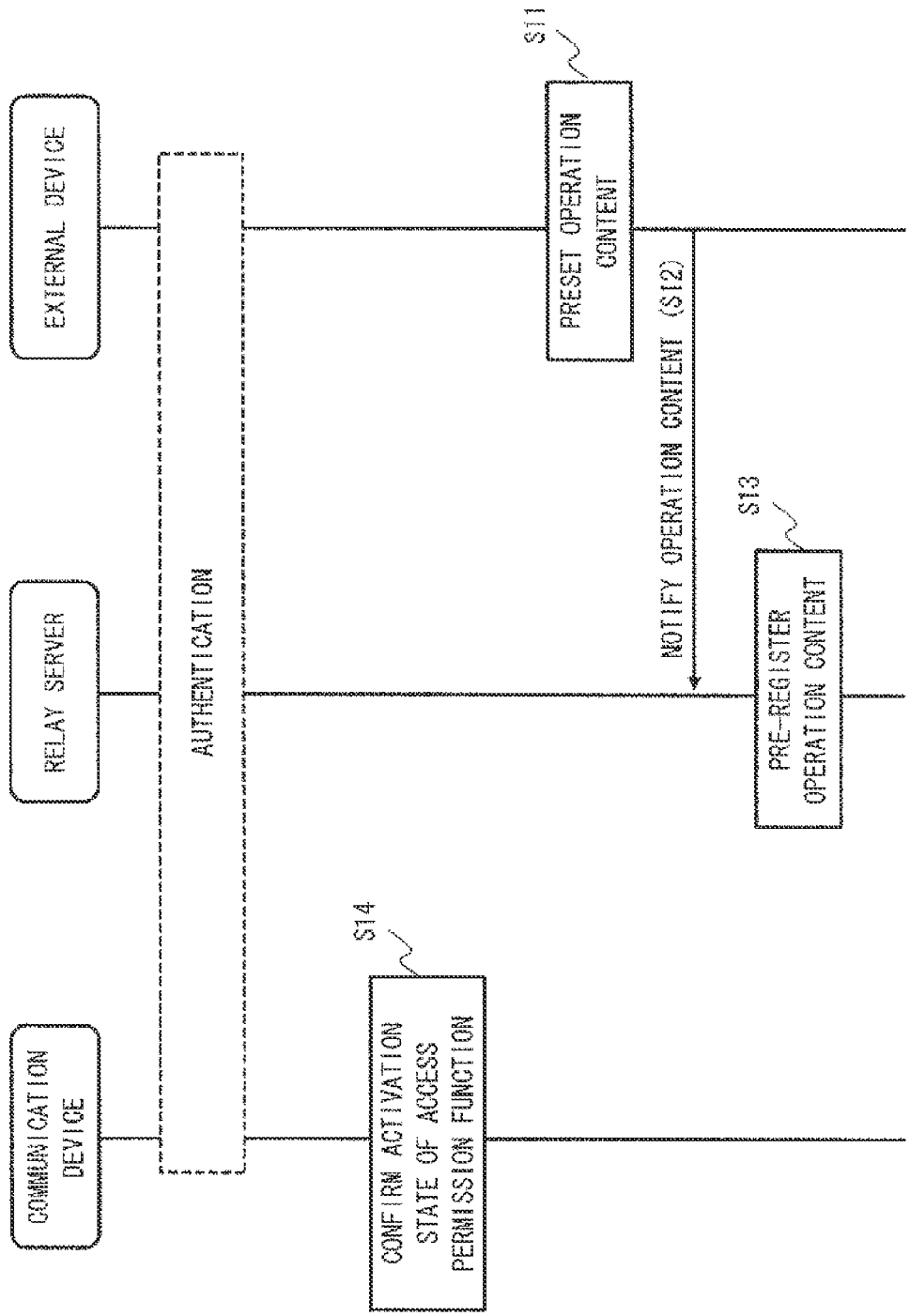
FIG. 2 is a preset processing sequence of the remote system according to the first exemplary embodiment.

Referring to the flowchart of FIG. 2 and the system diagram of FIG. 1, a flow of preset processing among the communication device 10, the external device 50, and the relay server 60 according to the first exemplary embodiment of the present invention will be described. First, the user of the external device 50 designates a communication device as a target of the remote operation, thereby specifying the communication device 10 as a target of the remote operation. Next, authentication is performed among the communication device 10 specified as the target of the remote operation, the relay server 60, and the external device 50. As an authentication method, a typical authentication method may be used. In this exemplary embodiment, the authentication is not necessarily performed.

Further, the access management unit 13 of the communication device 10 confirms whether or not the access authorization function is in the activated state (that is, whether or not the remote operation from the relay server 60 is possible) (S14). The confirmation step may be executed immediately before starting the remote operation. As described above, the activation of the access authorization function is performed according to the activation timing generated by the access management unit 13.

After that, the external device 50 accepts the presetting of the remote operation content by the user who operates the external device 50 (S11). Next, the external device 50 notifies the relay server 60 of the input remote operation content (S12). Then, the relay server 60 holds the notified remote operation content in the terminal operation management storage unit 62 (S13). Here, the remote operation content may be notified to the relay server 60 from the external device 50 during authentication. Alternatively, the remote operation content may be registered in the relay server during authentication, and the relay server 60 may notify the communication device 10 of the remote operation content during authentication. When the communication device 10 is accessed from the relay server 60 by setting the remote operation content as authentication information, the communication device 10 can authorize the access from the relay server 60 only when the remote operation content set as the authentication information is executed. When the remote operation content accepted by the external device 60 is the operation content which is not authorized by the external device 50, the relay server 60 may be configured to reject storage of the unauthorized operation content into the terminal operation management storage unit 62, or to reject notification of the unauthorized operation content to the communication device 10.

The internal function processing unit 15 of the communication device 10 having received the notification of the remote operation content from the relay server 60 executes processing corresponding to the remote operation content.

According to this exemplary embodiment, the remote operation content is registered in the relay server 60 (besides registration, the relay server executes reaccess and remote operation), which eliminates the need for the operator of the external device 50 to execute re-access at the timing when the communication device 10 authorizes the remote operation, even when the remote operation cannot be carried out because the communication device 10 is not powered on during access from the relay server 60, for example. That is, the procedure in the remote operation system can be simplified by performing the remote operation via the relay server 60.

Second Exemplary Embodiment

Figure 3:
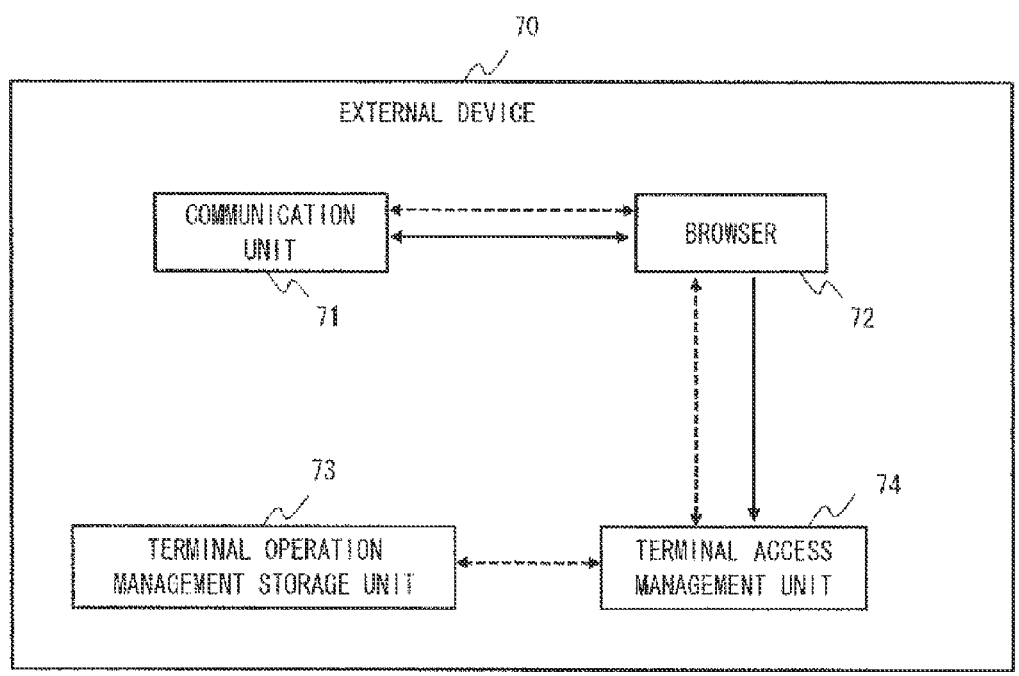
FIG. 3 is a configuration diagram of an external device according to a second exemplary embodiment.

This exemplary embodiment illustrates a configuration in which the external device implements the function of the relay server 60 in the first exemplary embodiment. A configuration example of the external device according to a second exemplary embodiment will be described with reference to FIG. 3. Specifically, an external device 70 includes a communication unit 71, a browser 72, a terminal operation management storage unit 73, and a terminal access management unit 74.

Since the external device includes the terminal operation management storage unit 73 and the terminal access management unit 74, the external device 70 is capable of directly notifying the communication device 10 of the remote operation content stored in the terminal operation management storage unit 73. In other words, it can be said that this configuration is a configuration in which the function implemented by the relay server 60 is disposed on the external device side in the first exemplary embodiment. This configuration eliminates the need for physically disposing a server ("relay server 60" in the first exemplary embodiment) in the remote operation system, and reduces costs.

Third Exemplary Embodiment

In this exemplary embodiment, a description is given of an example in which an administrator of a company uses a personal computer to check the action in the past few days of an employee who owns a mobile phone terminal. Specifically, an example will be described in which assuming that the personal computer owned by the administrator of the company corresponds to the external device in the first exemplary embodiment and the mobile phone terminal owned by the employee of the company corresponds to the communication device, the personal computer executes the remote operation of "reading out the positional information history of the mobile phone terminal every 15 minutes in the past 24 hours and transmitting the positional information history to the personal computer" for the mobile phone terminal.

Figure 4:
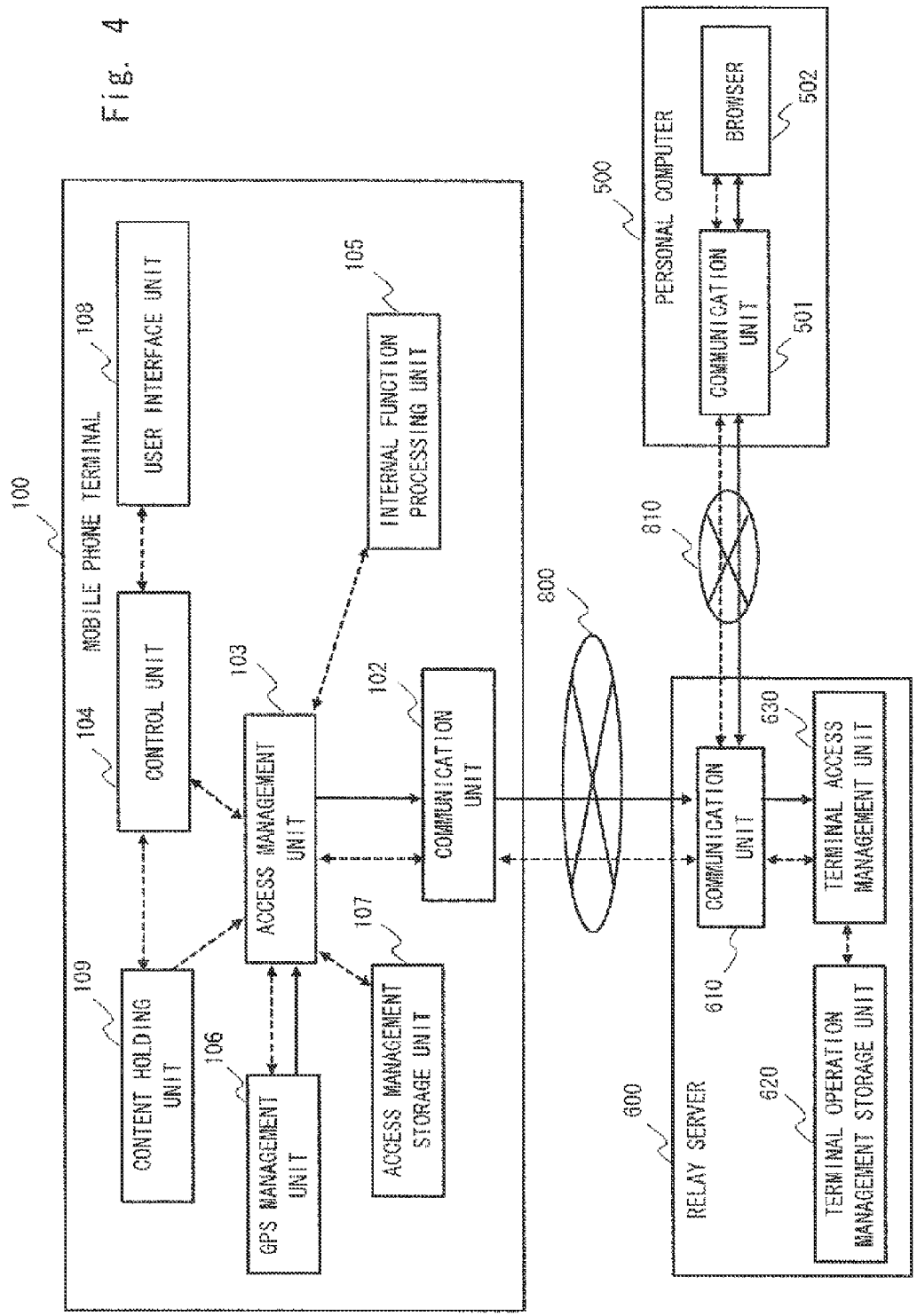
FIG. 4 is a configuration diagram of a remote system according to a third exemplary embodiment.

FIG. 4 is a configuration example of a remote operation system according to this exemplary embodiment. Note that a mobile phone terminal 100 shown in FIG. 4 is an example of the communication device. The illustration of components similar to those of the communication device 10 in the first exemplary embodiment is omitted. The mobile phone terminal 100 communicates with a personal computer 500 (an example of the external device) via a network 800.

In this exemplary embodiment, an API (Application Program Interface) function using GPS (Global Positioning System) will be described as an example of functions to be implemented by an internal function processing unit 105 of the mobile phone terminal 100. A GPS management unit 106 measures the current position by using the GPS. The GPS management unit 106 may hold previous positioning information which is periodically obtains. The positioning information measured in the past is managed in time sequence, together with time stamps, thereby enabling display of a movement history of the mobile phone terminal 100. The GPS management unit 106 may hold latitude/longitude information acquired using the GPS, or may convert the latitude/longitude information by using map information held in the memory or the like in the mobile phone terminal 100 and hold the information as address information or the like.

An access management storage unit 107 holds authentication information between the mobile phone terminal 100 and a relay server 600. For example, the access management storage unit 107 manages, in a manner associated with each other, an identifier of the relay server 600 which authorizes the access, and the remote operation content instructed from the personal computer 500 via the relay server 600. This allows an access management unit 103 of the mobile phone terminal 103 to accept the remote operation when access is made from the relay server 600 and the remote operation content stored in the access management storage unit 107 is instructed.

A user interface unit 108 accepts an input from a user by using a key input unit (not shown). The key input unit is composed of a keyboard, a numeric keypad, a button, a touch-pad, or the like. The user interface unit 108 outputs information processing results of the mobile phone terminal 100 to a display unit (not shown), and allows the user to confirm the information processing results. A liquid crystal screen or the like is used as the display unit.

A flow of determination processing as to whether or not to accept a remote operation in the mobile phone terminal 100 according to this exemplary embodiment will be described with reference to FIG. 5. First, the mobile phone terminal 100 receives access information from the personal computer 500 via the relay server 600 (S21). The access information is information that is notified during the communication in which the personal computer 500 remotely operates the mobile phone terminal 100. The access information is, for example, authentication information for the mobile phone terminal 100 to accept the remote operation from the personal computer 500. Next, the access management unit 103 of the mobile phone terminal 100 confirms whether or not an in-terminal server (an example of "access authorization function") is activated when access is made from the personal computer 500 via the communication unit 102 (S22). When the in-terminal server is activated, the access is authorized (S23), and the operation from the personal computer 500 is accepted. On the other hand, when the in-terminal server is not activated, the access is not authorized (S24), and the access information received via the communication unit 102 is discarded, for example.

The configurations of the personal computer 500 and the relay server 600 are similar to those of the first exemplary embodiment.

Figure 6:
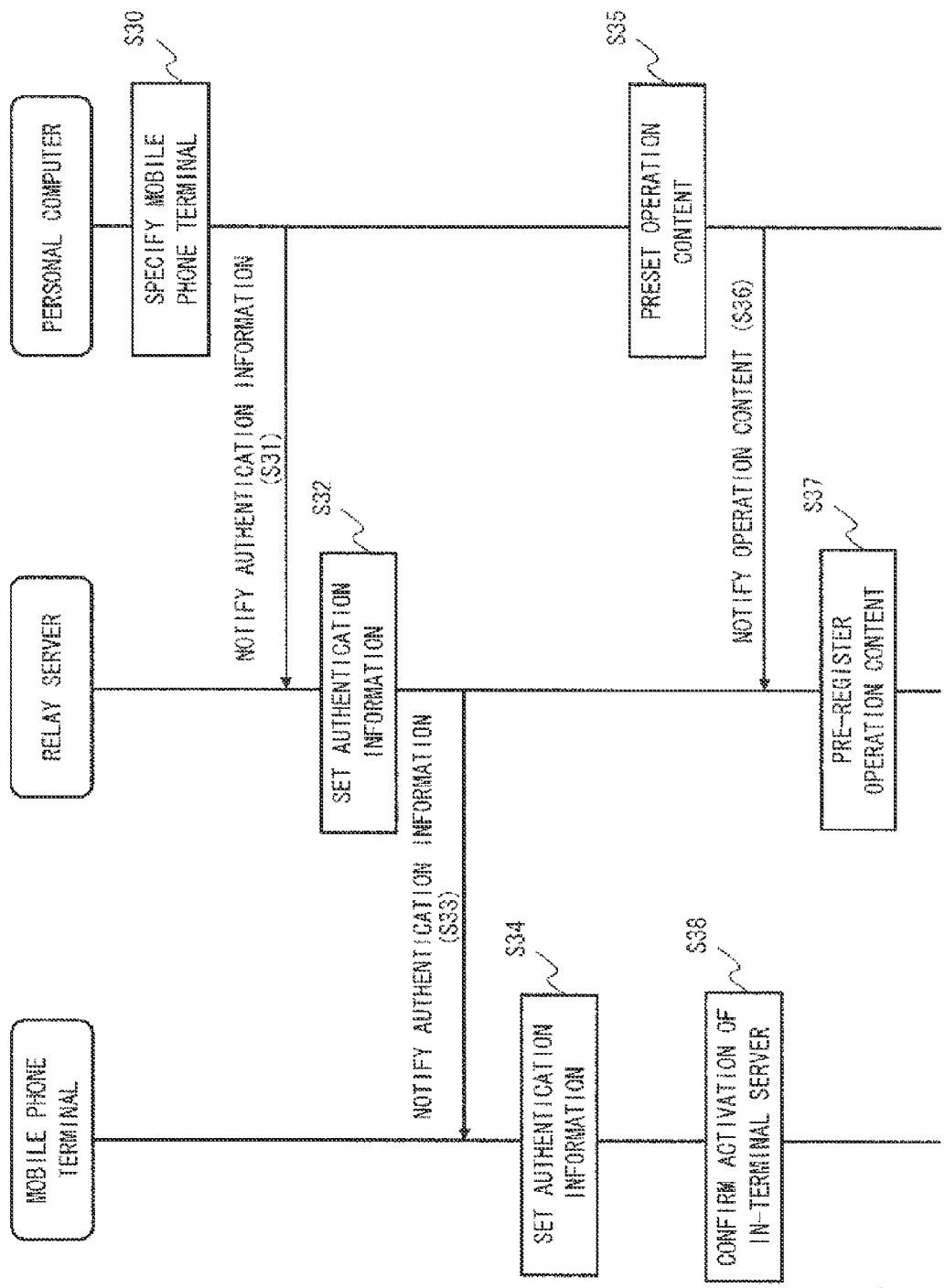
FIG. 6 is a present processing sequence of the remote system according to the third exemplary embodiment.

A flow of preset processing among the mobile phone terminal 100, the personal computer 500, and the relay server 600 according to this exemplary embodiment will be described with reference to FIG. 6. First, the administrator of the company that controls the personal computer 500 designates a counterpart as a target of the remote operation by using the input device of the personal computer 500, for example, and based on this, the personal computer 500 specifies the mobile phone terminal 100 as the target of the remote operation (S30). Subsequently, the personal computer 500 notifies the relay server 600 of authentication information (S31). The authentication information includes information such as an identifier for identifying the personal computer 500, and a cryptography key for use in communication between the relay server 600 and the personal computer 500. Next, the relay server 600 sets the authentication information in the memory or the like (S32). Then, the relay server 600 notifies the mobile phone terminal 100 of the authentication information (S33). The authentication information notified to the mobile phone terminal 100 from the relay server 600 includes information such as an identifier for identifying the relay server 600, and a cryptography key for use in communication between the relay server 600 and the mobile phone terminal 100. Then, the mobile phone terminal 100 sets the authentication information in the memory or the like (S34). Thus, the setting of mutual authentication information between the mobile phone terminal 100 and the relay server 600 allows only the relay server 600 to access the mobile phone terminal 100, for example. In the case of accessing the mobile phone terminal 100 thereafter, the relay server 600 may notify the mobile phone terminal 100 of the authentication information to thereby allow the mobile phone terminal 100 to authorize the access from the relay server 600.

After that, the access management unit 103 of the mobile phone terminal 100 confirms whether or not the remote operation from the relay server 600 is possible, i.e., whether or not the in-terminal server is activated (S38). Setting as to whether or not to authorize the remote operation, i.e., setting of the in-terminal server activation timing may be arbitrarily made by the user of the mobile phone terminal 100, or may be made by a time or the like.

As a result of confirming the activation of the in-terminal server, in the case where in-terminal server is not activated and the time for activating the in-terminal server or the time for holding the activated state is preliminarily set in the mobile phone terminal 100, an in-terminal server activation estimated time, for example, can be notified by e-mail or the like when access is made from the relay server 600. This allows the relay server 600 to recognize the subsequent in-terminal server activation time even if the in-terminal server of the mobile phone terminal 100 is not activated when the relay server 600 accesses the mobile phone terminal 100.

Next, the personal computer 500 accepts the presetting of the remote operation content by the administrator of the company that controls the personal computer 500 (S35). Then, the personal computer 500 notifies the relay server 600 of the input remote operation content (S36). Then, the relay server 600 holds the notified remote operation content in a terminal operation management storage unit 620 (S37). Here, the remote operation content is notified together with the authentication information from the personal computer 500 to the relay server 600 in step S31. When the authentication is successful, the relay server 600 may be configured to accept the notification of the operation content. Alternatively, when the relay server 600 notifies the mobile phone terminal 100 of the remote operation content as well as the authentication information in step S33, and when the authentication is successful, the mobile phone terminal 100 may be configured to accept the notification of the operation content.

The mobile phone terminal 100 can also use the remote operation content as the authentication information. Specifically, the access management unit 103 of the mobile phone terminal 100 may be configured to manage, in a manner associated with each other, at least one personal computer, which is capable of performing a remote operation of the mobile phone terminal 100, and one or more remote operation contents, and to authorize the access from the relay server 600 when the remote operation content notified from the relay server 600 is the remote operation content associated with the personal computer 500. When the remote operation content accepted by the personal computer 500 is an operation content which is not authorized by the personal computer 500, the relay server 600 may be configured to reject storage of the unauthorized operation content, or notification of the unauthorized operation content to the mobile phone terminal 100.

Figure 7:
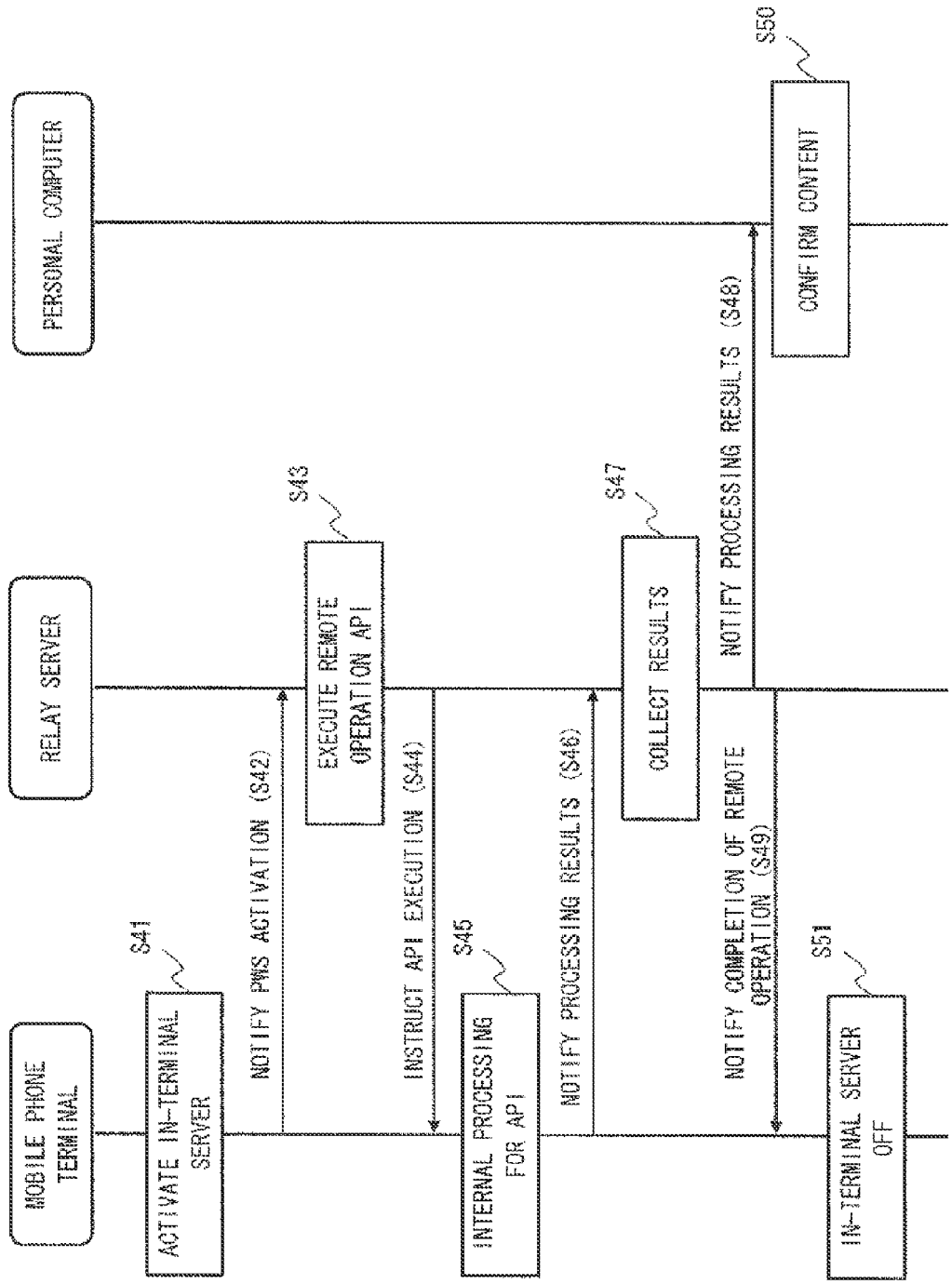
FIG. 7 is an execution processing sequence for a remote operation according to the third exemplary embodiment.

Referring next to FIG. 7, a flow of processing of executing a remote operation according to this exemplary embodiment will be described. In this exemplary embodiment, an example will be described in which the administrator of the company checks the action in the past few days of the employee who owns the mobile phone terminal 100, by using the personal computer 500, as described above.

First, in the mobile phone terminal 100, the in-terminal server is activated by an activation instruction from the user, or wake-up by a preset timer, for example (S41). For example, when the user sets the in-terminal server activation time by using the timer in the control unit 104 through the user interface unit 108, the access management unit 103 of the mobile phone terminal 100 determines an appropriate port number at a preset time and activates the in-terminal server. Next, the mobile phone terminal 100 notifies the relay server 600 that the in-terminal server has been activated (S42). At this time, the access management unit 103 notifies the relay server 600 of the URL and port number for use in access from the relay server 600 to the in-terminal server, together with the activation notification of the in-terminal server.

The activation of the in-terminal server only in use makes it possible to reduce power consumption as compared with the case where the in-terminal server is constantly activated. Particularly when the in-terminal server is mounted in a mobile phone, the activation of the in-terminal server only in use makes it possible to reduce battery consumption even if access is frequently made from the outside. Further, the use of different port numbers which are determined upon each activation of the in-terminal server prevents a DoS (Denial of Service) attack by an improper request from a malicious third person, and reduces problems such as an adverse effect of the DoS attack on the terminal functions.

Even in the case where the in-terminal server is activated by a timer or the like, when no remote operation content is registered in the relay server 600, the in-terminal server may be deactivated. Further, when the in-terminal server is activated and no access is made from the personal computer 500 for a certain period of time, the mobile phone terminal 100 may autonomously deactivate the in-terminal server. The configuration described above makes it possible to reduce power consumption as compared with the case where the in-terminal server is constantly activated.

The activation of the in-terminal server can also be controlled according to the remaining amount of battery of the mobile phone terminal 100. When the remaining amount of battery of the mobile phone terminal 10 is lower than a certain threshold, the control unit 104 can deactivate the in-terminal server. On the contrary, when the remaining amount of battery of the mobile phone terminal 100 becomes higher than the certain threshold after charging, the control unit can activate the in-terminal server. The in-terminal server may be activated based not only on the remaining amount of battery, but also on the time from the start of charging. This avoids troubles such as running out of battery during the remote operation.

Next, the terminal access management unit 630 in the relay server 600 reads out the remote operation content registered in the terminal operation management storage unit 620. The remote operation content is, for example, a content indicating that "a positional information history of the mobile phone terminal which is obtained every 15 minutes in the past 24 hours is read out from the mobile phone terminal 100 to the relay server 600 and transmitted to the personal computer 500". Further, the terminal access management unit 630 transmits, to the URL and port number notified from the mobile phone terminal 100, the HTTP message in which the content indicating that "the positional information history is read out and transmitted to the relay server 600" is set. Specifically, the relay server 600 executes such an API (Application Program Interface) that "the positional information history for the past 24 hours is read out and this information is returned as a return value" (S43), and notifies the mobile phone terminal 100 of information on the execution of the API, i.e., an API execution instruction (S44).

Next, when the HTTP is transmitted and the execution of the API is notified, the access management unit 103 receives information on the positional information history from the GPS management unit 106 (S45). Further, the access management unit 103 sets the received information in a return message of the HTTP message, and transmits the message to the relay server 600 (S46). The relay server 600 temporarily stores the notified result in the memory or the like. If there is another instruction from the personal computer 500 or a control or management instruction for the set mobile phone terminal 100, the instruction is executed in a similar manner. The relay server 600 collects the processing results obtained from the mobile phone terminal 100 through these processes (S47), and transmits the results to the personal computer 500 (S48). Alternatively, the relay server 600 generates a Web content obtained by collecting the processing results so as to be confirmed upon reception of a browsing instruction by the HTTP message from the personal computer 500, thereby enabling browsing from the personal computer 500. This allows the administrator of the company that controls the personal computer 500 to confirm the execution result of the remote operation (S50).

Further, the relay server 600 notifies the mobile phone terminal 100 of the HTTP message indicating that the remote operation designated by the personal computer 500 is completed (S49). Upon receiving the notification of the completion of the remote operation from the relay server 600, the access management unit 103 of the mobile phone terminal 100 deactivates the in-terminal server (S51). This leads to a reduction in power consumption as compared with the case where the in-terminal server is constantly activated.

As described above, according to this exemplary embodiment, the registration of the remote operation content in the relay server 600 allows the administrator of the company to execute the remote operation without the need for the administrator himself/herself to work also during the time period (for example, midnight or early morning) in which the owner (employee) of the mobile phone terminal 100 is less likely to operate the mobile phone terminal. Also such a remote operation that is performed routinely and performed by repeating a predetermined operation, such as checking of the action history of an employee for a day, can be carried out only by registering the operation content in the relay server once. This makes the administrator free from troublesome work of repeating the same operation.

Fourth Exemplary Embodiment

A fourth exemplary embodiment will be described assuming that a mobile phone terminal 110 is replaced with the mobile phone terminal 100 shown in FIG. 4; an access management 113 is replaced with the access management unit 103; a personal computer 510 is replaced with the personal computer 500; and a relay server 610 is replaced with the relay server 600.

In addition to the exemplary embodiments described above, a time period in which the in-terminal server is kept in the activated state can also be preliminarily set by using a timer or the like. For example, the time period can be set such that the in-terminal server is activated from midnight to 3:00 a.m. every Wednesday. In this case, even when the access management unit 113 of the mobile phone terminal 110 receives the HTTP message indicating that the remote operation from the server 610 is completed within the time period that is set to keep the in-terminal server in the activated state, the in-terminal server can be maintained in the activated state until a preset in-terminal server activation end time without deactivating the in-terminal server. This allows the remote operation even when another remote operation is to be performed after completion of a predetermined remote operation from the personal computer 510, or even when access is made from another personal computer within the set time period. When the remote operation from the personal computer 510 is continued after expiration of the preset activation time, the mobile phone terminal 110 can keep the in-terminal server in the activated state until completion of the continued remote operation, instead of immediately deactivating the in-terminal server. To avoid excess of the activation time, the relay server 610 or the personal computer 510 may be notified that the end of the activation time is approaching, and the activation time may be extended through an operation by a user of the mobile phone terminal 110 or by an operator of the personal computer 510.

When there is an interrupt operation for the mobile phone terminal 110 during the remote operation, the mobile phone terminal 110 can deactivate the in-terminal server and execute the interrupt operation. Further, when there is an interrupt operation for the mobile phone terminal 110 during execution of the remote operation by the relay server 610, the execution of the interrupt operation may be waited until the in-terminal server is deactivated.

When the in-terminal server is deactivated during the remote operation, the relay server 610 may store the remote operation content completed by the time when the in-terminal server is deactivated, and when the in-terminal server is reactivated, the execution of the completed remote operation content may be skipped. This eliminates the need to repeat the same operation.

When the in-terminal server is deactivated during the remote operation, the relay server 610 or the personal computer 510 may be notified that the in-terminal server is deactivated. In this case, the relay server 610 or the personal computer 510 may notify the mobile phone terminal 110 of a request for reactivating the in-terminal server, thereby allowing the user of the mobile phone terminal 110 to reactivate the in-terminal server. Further, in the mobile phone terminal 110, when it is determined that the in-terminal server is deactivated due to an unexpected trouble, the in-terminal server may be automatically reactivated. In general, when the mobile phone terminal 110 autonomously activates the in-terminal server, for example, in an unavoidable case such as an emergency situation, the operator of the personal computer 510 may activate the in-terminal server instead by the remote operation. In this case, a password for emergency may be set, for example.

It is also possible to assign priorities to the case where the mobile phone terminal 110 autonomously activates the in-terminal server and the case where the in-terminal server is activated by the remote operation from the personal computer 510. The above-mentioned modified example allows a more flexible operation of the mobile phone terminal from the personal computer.

Fifth Exemplary Embodiment

A fifth exemplary embodiment will be described assuming that the mobile phone terminal 100 shown in FIG. 4 is replaced with a mobile phone terminal 120; a content holding unit 109 is replaced with a content holding unit 129; the personal computer 500 is replaced with a personal computer 520; and the relay server 600 is replaced with a relay server 620.

In this exemplary embodiment, an example will be described in which photographs and the like stored in the mobile phone terminal 120 can be browsed on the personal computer 520 without bothering the user whose uses the mobile phone terminal 120. Examples of the photographs stored in the mobile phone terminal 120 include scene photographs which are taken in a place visited on business. As an example of the troublesome action for the user, the user sends photographs or the like to an administrator of a company or the like by using a mail function of the mobile phone terminal 120.

In this exemplary embodiment, a content holding function will be described as an example of the internal functions of the mobile phone terminal 120. The content holding unit 129 holds still images or moving images captured by using a camera function in the mobile phone terminal 120, photographs received from another mobile phone, images downloaded from Web pages, and the like.

The relay server 620 executes such an API that "still image and moving image files captured using the built-in camera in the past 24 hours are transmitted to the relay server 620 as return values of an HTTP request", and notifies information on the execution of the API to the URL and port number which are notified from the mobile phone terminal 120. The mobile phone terminal 120 transmits data held in the content holding unit 129 to the relay server 620 as a return message. This allows the relay server 620 to read out (pull) the data within the mobile phone terminal 120.

Sixth Exemplary Embodiment

A sixth exemplary embodiment will be described assuming that the mobile phone terminal 100 shown in FIG. 4 is replaced with a mobile phone terminal 130; the personal computer 500 is replaced with a personal computer 530; and the relay server 600 is replaced with a relay server 630.

This exemplary embodiment illustrates an example in which data is written into the mobile phone terminal 130 from the relay server 630. For example, a user's planned visit schedule for the next day can be set in a scheduler (application related to schedule setting), which is mounted in the mobile phone terminal 130, from the personal computer 530. Specifically, the relay server 630 executes such an API that "the planned visit schedule for the next day received from the personal computer 530 is written into the schedule application of the mobile phone terminal 130, and notifies information on the execution of the API to the URL and port number which are notified from the mobile phone terminal 130. This allows the relay server 630 to write (push) the data into the application within the mobile phone terminal 130. By a similar method, customer information on the visited place or the like may be written into a database application of the mobile phone terminal 130 from the personal computer 530, and the information may be browsed on the mobile phone terminal 130.

Seventh Exemplary Embodiment

In a seventh exemplary embodiment, the remote operation system according to the second exemplary embodiment will be described in detail. That is, the remote operation system of this exemplary embodiment has a configuration in which the external device implements the function of the relay server.

This exemplary embodiment illustrates an example in which a supporter, such as a family member of a user of senior generation (hereinafter referred to as "senior user"), reads out a GPS movement history of the senior user from a mobile phone terminal owned by the senior user (hereinafter referred to as "terminal for senior use"). Specifically, an example will be described in which assuming that the external device of the first exemplary embodiment corresponds to a mobile phone terminal owned by the supporter (hereinafter referred to as "supporter terminal") and the communication device corresponds to the terminal for senior use, the supporter terminal carries out such a remote operation that "a positional information history of the terminal for senior use which is obtained every 15 minutes in the past 24 hours is read out to the supporter terminal from the terminal for senior use" for the terminal for senior use.

Figure 8:
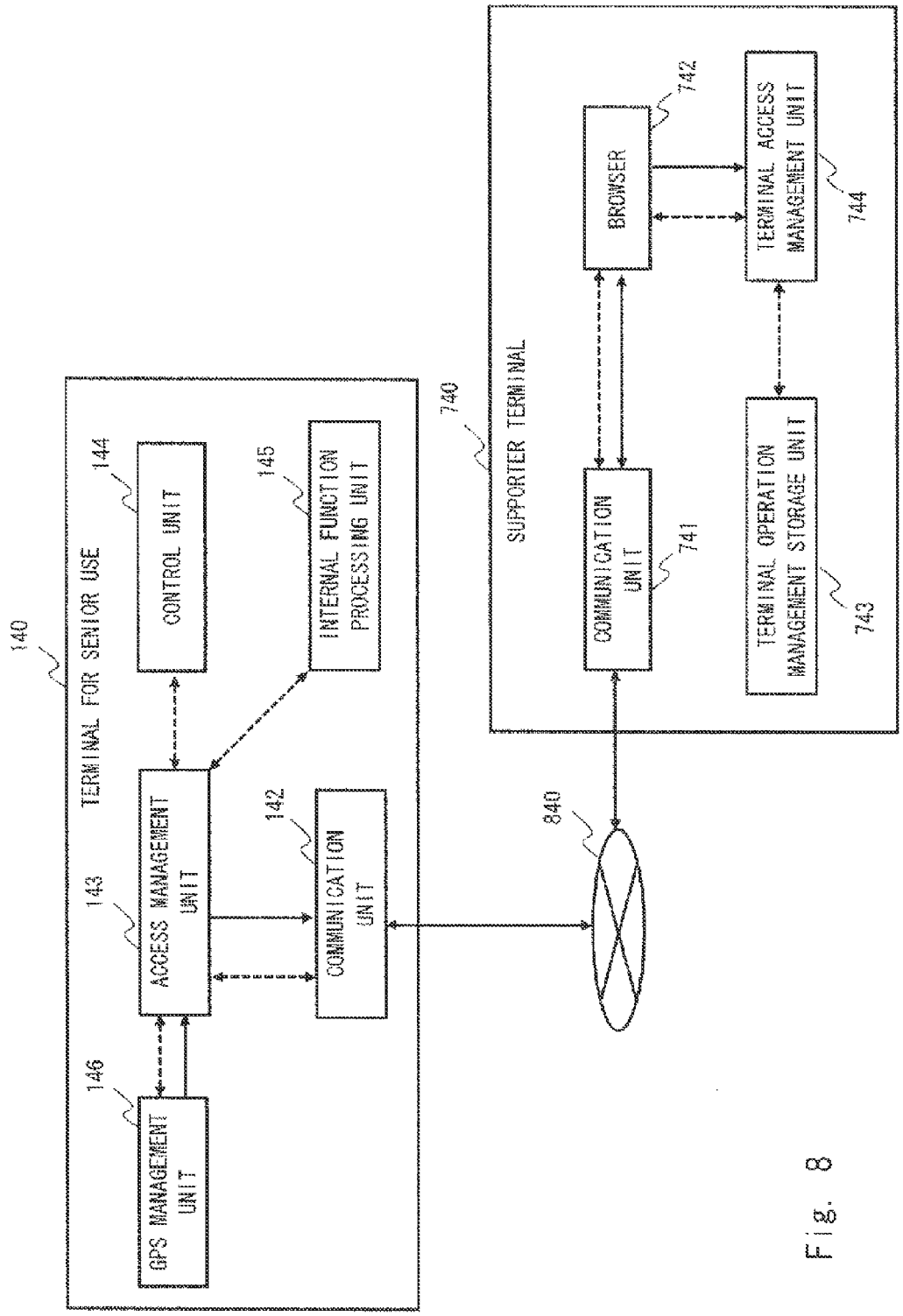
FIG. 8 is a configuration diagram of a remote system according to a seventh exemplary embodiment.

FIG. 8 is a configuration example of the remote operation system according to this exemplary embodiment. Note that a terminal for senior use 140 shown in FIG. 8 may have a configuration similar to that of the third exemplary embodiment. The terminal for senior use 140 communicates with a supporter terminal 740 (an example of the external device) via a network 840.

In this exemplary embodiment, a GPS function will be described as an example of functions to be implemented by an internal function processing unit 145 of the terminal for senior use 140. A GPS management unit 146 is similar to the GPS management unit 106 described in the third exemplary embodiment.

Next, a configuration example of the supporter terminal 740 will be described. The supporter terminal 740 includes a communication unit 741, a browser 742, a terminal operation management storage unit 743, and a terminal access management unit 744.

Since the supporter terminal 740 includes the terminal operation management storage unit 743 and the terminal access management unit 744, the supporter terminal 740 can directly carry out a remote operation for the terminal for senior use 140. This configuration eliminates the need to physically dispose a server ("relay server 600" of the first exemplary embodiment described above) in the remote operation system, resulting in a reduction in costs.

Figure 5:
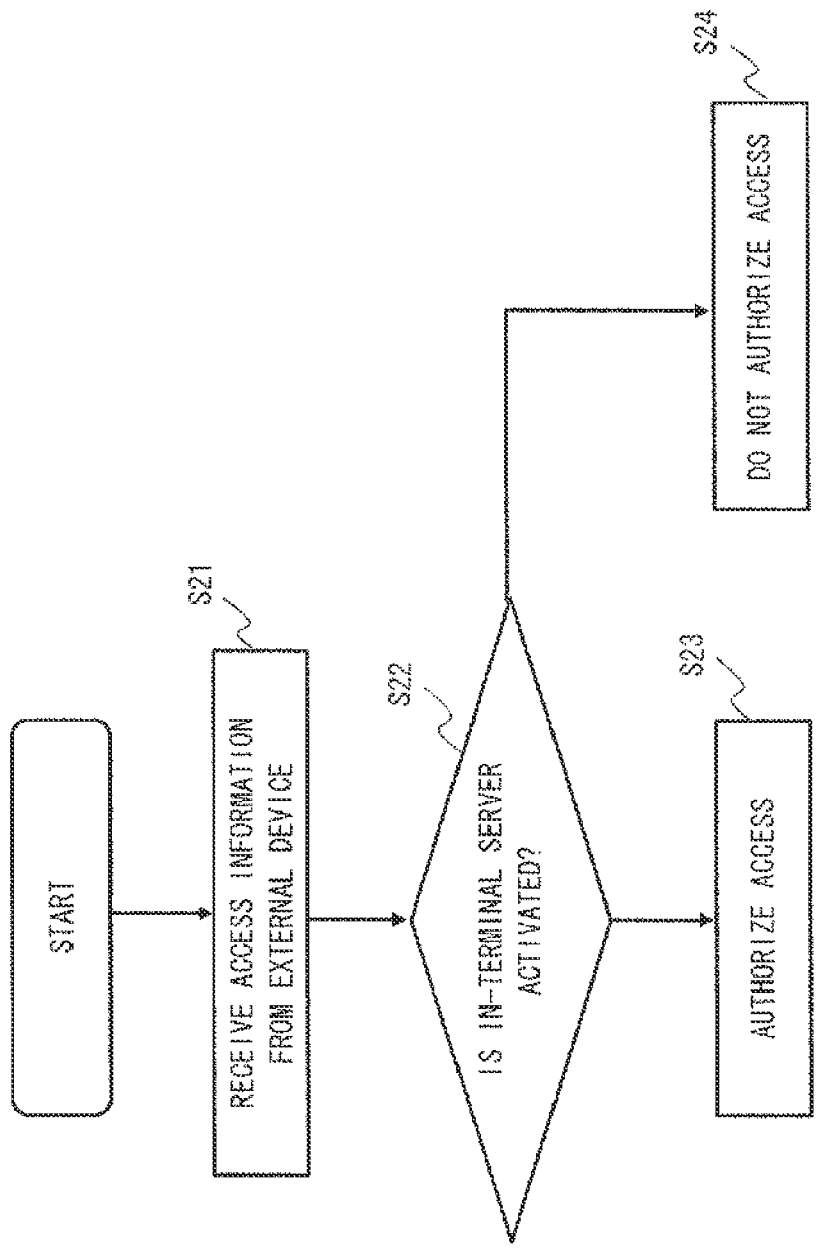
FIG. 5 is a flowchart showing determination processing as to whether or not to accept a remote operation according to the third exemplary embodiment.

Referring next to FIG. 5, a flow of determination processing as to whether or not to accept a remote operation in the terminal for senior use 140 according to this exemplary embodiment will be described. First, the terminal for senior use 140 receives access information from the supporter terminal 740 (S21). The access information is information to be notified in the communication for the supporter terminal 740 to perform a remote operation of the terminal for senior use 140. The access information is, for example, authentication information for the terminal for senior use 140 to accept the remote operation from the supporter terminal 740. Next, when there is an access from the supporter terminal 740 through a communication unit 142, an access management unit 143 confirms whether or not the in-terminal server is activated (S22). When the in-terminal server is activated, the access is authorized (S23), and the operation from the supporter terminal 740 is accepted. On the other hand, when the in-terminal server is not activated, the access is not authorized (S24), and the access information received through the communication unit 142 is discarded, for example.

Figure 9:
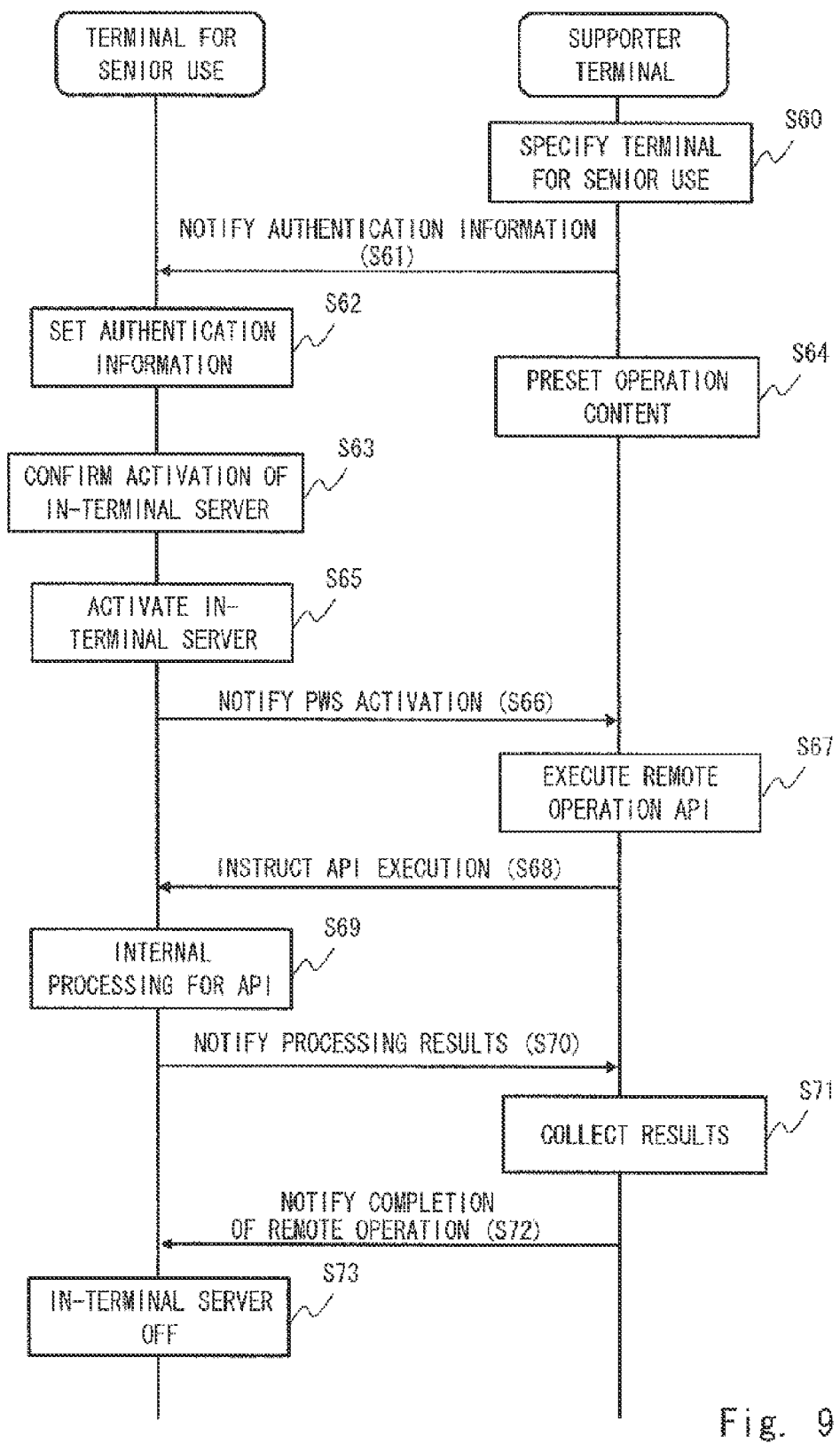
FIG. 9 is an execution processing sequence for a remote operation according to the seventh exemplary embodiment.

Referring to FIG. 9, a flow of preset processing between the terminal for senior use 140 and the supporter terminal 740 according to this example will be described. First, the supporter terminal 740 specifies the terminal for senior use 140 as a target of the remote operation, based on an instruction of the supporter (S60). Subsequently, the supporter terminal 740 notifies the terminal for senior use 140 of the authentication information (S61). The authentication information includes information such as an identifier for identifying the supporter terminal 740 and a cryptography key for use in communication between the terminal for senior use 140 and the supporter terminal 740. Next, the terminal for senior use 140 sets the authentication information in the memory or the like (S62). Thus, the setting of mutual authentication information between the terminal for senior use 140 and the supporter terminal 740 allows only the supporter terminal 740 to access the terminal for senior use 140, for example. In the case of accessing the terminal for senior use 140 thereafter, the supporter terminal 740 may notify the terminal for senior use 140 of the authentication information to thereby allow the terminal for senior use 140 to authorize the access from the supporter terminal 740.

After that, the terminal for senior use 140 confirms whether or not the remote operation from the supporter terminal 740 is possible (S63). Setting as to whether or not to authorize the remote operation may be arbitrarily made by the user of the terminal for senior use 140, or may be made by a timer or the like.

As a result of confirming the activation of the in-terminal server, in the case where in-terminal server is not activated and the time for activating the in-terminal server or the time for holding the activated state is preliminarily set in the terminal for senior use 140, an in-terminal server activation estimated time, for example, can be notified by e-mail or the like when access is made from the supporter terminal 740. This allows the supporter terminal 740 to recognize the subsequent in-terminal server activation time even if the in-terminal server of the terminal for senior use 140 is not activated when the supporter terminal 740 accesses the terminal for senior use 140.

Next, the supporter terminal 740 accepts the presetting of the remote operation content from the supporter who operates the supporter terminal 740, and holds the notified remote operation content in the terminal operation management storage unit 743 (S64). Here, the remote operation content may be notified from the supporter terminal 740 to the terminal for senior use 140 together with the authentication information in step S61, and if the authentication is successful, the terminal for senior use 140 may be configured to accept the notification of the operation content. The terminal for senior use 140 can also use the remote operation content as the authentication information. Specifically, the access management unit 143 of the terminal for senior use 140 may be configured to manage, in a manner associated with each other, at least one supporter terminal, which is capable of performing a remote operation of the terminal for senior use 140, and one or more remote operation contents, and to authorize the access from the supporter terminal 740 when the remote operation content notified from the supporter terminal 740 is the remote operation content associated with the supporter terminal 740. Further, when the remote operation content accepted from the supporter is the operation content which is not authorized by the supporter terminal 740, the supporter terminal 740 may reject storage of the unauthorized operation content into the terminal operation management storage unit 743, or notification of the unauthorized operation content to the terminal for senior use 140.

Subsequently, a flow of processing of executing a remote operation will be described. In this exemplary embodiment, an example will be described in which the supporter checks the action in the past few days of the senior user who owns the terminal for senior user 140, by using the supporter terminal 740, as described above.

After step S63, the access management unit 143 of the terminal for senior use 140 activates the in-terminal server by an activation instruction from the user, or wake-up by a preset timer, for example (S65). For example, when a control unit 144 sets the in-terminal server activation time at 24 o'clock every day by using the timer, an appropriate port number is determined at the set time and the in-terminal server is activated. Next, the terminal for senior use 140 notifies the supporter terminal 740 that the in-terminal server has been activated (S66). At this time, the access management unit 143 notifies the supporter terminal 70 of the URL and port number for use in access from the supporter terminal 70 to the in-terminal server, together with the notification of the activation of the in-terminal server.

The activation of the in-terminal server only in use makes it possible to reduce power consumption as compared to the case where the in-terminal server is constantly activated. Particularly when the in-terminal server is mounted in a mobile phone, the activation of the in-terminal server only in use makes it possible to reduce battery consumption even if access is frequently made from the outside. Further, the use of different port numbers which are determined upon each activation of the in-terminal server prevents a DoS attack by an improper request from a malicious third person, and reduces problems such as an adverse effect of the DoS attack on the terminal functions.

In the case where the in-terminal server is activated by a timer or the like, when no remote operation content is registered in the supporter terminal 740, the in-terminal server may be deactivated. Further, when the in-terminal server is activated and no access is made from the supporter terminal 740 for a certain period of time, the terminal for senior use 140 may autonomously deactivate the in-terminal server. The configuration described above makes it possible to reduce power consumption as compared with the case where the in-terminal server is constantly activated.

The activation of the in-terminal server can also be controlled according to the remaining amount of battery of the terminal for senior use 140. When the remaining amount of battery of the terminal for senior use 140 is lower than a certain threshold, the control unit 144 can deactivate the in-terminal server. On the contrary, when the remaining amount of battery of the terminal for senior use 140 becomes higher than the certain threshold after charging, the control unit can activate the in-terminal server. The in-terminal server may be activated based not only on the remaining amount of battery, but also on the time from the start of charging. This avoids troubles such as running out of battery during the remote operation.

Next, the terminal access management unit 744 in the supporter terminal 740 reads out the remote operation content registered in the terminal operation management storage unit 743. The remote operation content is, for example, a content indicating that "a positional information history of the terminal for senior use which is obtained every 15 minutes in the past 24 hours is read out from the terminal for senior use 140 to the supporter terminal 740". Further, the terminal access management unit 744 transmits, to the URL and port number notified from the terminal for senior use 140, the HTTP message in which the content indicating that "the positional information history is read out and transmitted to the supporter terminal 740" is set. Specifically, the supporter terminal 740 executes such an API (Application Program Interface) that "the positional information history for the past 24 hours is read out and this information is returned as a return value" (S67), and notifies the terminal for senior use 140 of information on the execution of the API, i.e., an API execution instruction (S68).

Next, when the HTTP message is transmitted to the access management unit 143 and the execution of the API is notified, the access management unit 143 receives information on the positional information history from the GPS management unit (S69). Further, the access management unit 143 sets the received information in a return message of the HTTP message, and transmits the message to the supporter terminal 740 (S70). The supporter terminal 740 stores the notified result in the memory or the like. If there is another instruction from the supporter terminal 740 or a control or management instruction for the terminal for senior use 140, the instruction is executed in a similar manner. The supporter terminal 740 collects the processing results obtained from the terminal for senior use 140 through these processes (S71). Alternatively, the supporter terminal generates a Web content obtained by collecting the processing results so as to be browsed. This allows the supporter who operates the supporter terminal 740 to confirm the execution result of the remote operation.

Upon completion of the pre-registered remote operation, the supporter terminal 740 notifies the terminal for senior use 140 of the HTTP message indicating the completion (S72). Upon receiving the notification of the completion of the remote operation from the supporter terminal 740, the access management unit 143 of the terminal for senior use 140 deactivates the in-terminal server (S73). This leads to a reduction in power consumption as compared with the case where the in-terminal server is constantly activated.

The registration of the remote operation content in the supporter terminal 740 allows the supporter to execute the remote operation without the need for the supporter himself/herself to work also during a time period (for example, midnight) in which the senior user is less likely to operate the terminal for senior use. Also such a remote operation that is performed routinely and performed by repeating a predetermined operation, such as checking of the action history of the senior user for a day, can be carried out only by registering the operation content in the relay server once. This makes the supporter free from troublesome work of repeating the same operation.

Eighth Exemplary Embodiment

An eighth exemplary embodiment will be described assuming that the terminal for senior use 140 shown in FIG. 8 is replaced with a terminal for senior use 150; the access management storage unit 143 is replaced with an access management storage unit 153; and the supporter terminal 740 is replaced with a supporter terminal 750.

In addition to the above-mentioned aspects, a modified example similar to the fourth exemplary embodiment can be applied to the seventh exemplary embodiment. For example, when an interrupt operation for the senior terminal 150 is included in the remote operation, the access management unit 153 of the senior terminal 150 can deactivate the in-terminal server and execute the interrupt operation.

Further, when there is an interrupt operation for the senior terminal 150 during execution of the remote operation by the supporter terminal 750, the execution of the interrupt operation may be waited until the in-terminal server is deactivated.

In the case where the in-terminal server is deactivated during the remote operation, the supporter terminal 750 can store the remote operation content completed by the time when the in-terminal server is deactivated, and can skip the execution of the completed remote operation content when the in-terminal server is reactivated. This eliminates the repetition of the same operation.

When the in-terminal server is deactivated during the remote operation, the terminal for senior use can notify the supporter terminal 750 that the in-terminal server has been automatically deactivated. In this case, the supporter terminal 750 can notify the terminal for senior use 150 of a request for reactivating the in-terminal server, and the in-terminal server can be reactivated by the senior user. Alternatively, when it is determined that the in-terminal server is deactivated due to an unexpected trouble in the terminal for senior use 150, the in-terminal server can be automatically reactivated immediately. Further, in general, when the terminal for senior use 150 autonomously activates the in-terminal server, for example, in an unavoidable case such as emergency situation, the supporter may activate the in-terminal server instead by a remote operation. In this case, a password for emergency may be preliminarily set, for example.

It is also possible to assign priorities to the case where the terminal for senior use 150 autonomously activates the in-terminal server, and the case where the in-terminal server is activated by a remote operation from the supporter terminal 750.

The above-mentioned modified example allows a more flexible remote operation of the terminal for senior use from the support terminal.

Ninth Exemplary Embodiment

Moreover, it is possible for the supporter to set a grandchild's photograph on a standby screen of the terminal for senior use. It is also possible for the supporter to write, into a scheduler, a schedule of nursing service provided to the senior user.

When an exemplary embodiment of the present invention is applied to a terminal for child use, the present invention can also be used for such applications that a parent checks a GPS movement history or a site browsing history on the child's mobile terminal, and limits the use of a part of functions.

Note that the present invention is not limited to exemplary embodiments described above, but can be modified as appropriate without departing from the scope of the invention. For example, instead of providing the relay server 600 of the third exemplary embodiment, the function of the relay server may be mounted in the personal computer 500, which is used by the administrator of the company, as in the seventh exemplary embodiment, or a relay server may be provided separately from the supporter terminal 740, which is used by the supporter of the seventh exemplary embodiment, as a matter of course.

The present invention has been described above with reference to exemplary embodiments, but the present invention is not limited to the exemplary embodiments described above. The configuration and details of the present invention can be modified in various manners which can be understood by those skilled in the art within the scope of the invention.

This application is based upon and claims the benefit of priority from Japanese patent application No. 2011-005470, filed on Jan. 14, 2011, the disclosure of which is incorporated herein in its entirety by reference.

REFERENCE SIGNS LIST

10 COMMUNICATION DEVICE
12, 102, 142 COMMUNICATION UNIT
13, 103, 143 ACCESS MANAGEMENT UNIT
14, 104, 144 CONTROL UNIT
15, 105, 145 INTERNAL FUNCTION PROCESSING UNIT
50, 70 EXTERNAL DEVICE
51, 71, 501, 741 COMMUNICATION UNIT
52, 72, 502, 742 BROWSER
60, 600 RELAY SERVER
61, 610 COMMUNICATION UNIT
62, 73, 620, 743 TERMINAL OPERATION MANAGEMENT STORAGE UNIT
63, 74, 630, 744 TERMINAL ACCESS MANAGEMENT UNIT
80, 81, 800, 810, 840 NETWORK
100 MOBILE PHONE TERMINAL
106, 146 GPS MANAGEMENT UNIT
107 ACCESS MANAGEMENT STORAGE UNIT
108 USER INTERFACE UNIT
109 CONTENT HOLDING UNIT
140 TERMINAL FOR SENIOR USE
500 PERSONAL COMPUTER
740 SUPPORTER TERMINAL

The invention claimed is:

1. A remote operation system comprising:
communication devices;
an external hardware device configured to specify at least one communication device as a target for a remote operation among the communication devices, and configured to accept an input of a remote operation content to be executed for the specified communication device; and
a relay configured to relay communication between the specified communication device and the external device,
wherein the relay comprises:
a storage configured to store the remote operation content accepted by the external device; and
a first processor configured to:
notify the specified communication device of the remote operation content, each of the communication devices comprise:
an internal function processing unit; and
a second processor configured to:
determine whether or not an in-terminal server is in an activated state without a user input, and
accept a notification of the remote operation content from the first processor and is configured to cause the internal function processing unit to operate when the in-terminal server is in the activated state,
wherein in response to a completion of the operation of the internal function processing unit according to the remote operation content for the communication device stored in the storage, the second processor is configured to deactivate the in-terminal server, and
wherein the execution of an interrupt operation is delayed until the in-terminal server is deactivated, in response to an interrupt operation for the communication device before completion of the operation of the internal function processing unit according to the remote operation content for the communication device stored in the storage.

2. The remote operation system according to claim 1, wherein the relay is configured to reject storage of the operation content by the storage or notification of the operation content by the first processor when the remote operation content accepted by the external hardware device is an operation content that is not authorized by the external hardware device.

3. The remote operation system according to claim 1, wherein the second processor is configured to notify the relay of the activation of the in-terminal server, and the first processor is configured to start notifying the remote operation content stored in the storage in response to the notification of the activation of the in-terminal server from the second processor.

4. The remote operation system according to claim 1, wherein the in-terminal server is configured to be activated in response to an activation instruction from a user.

5. The remote operation system according to claim 1, wherein the in-terminal server is configured to be activated at a preset timing.

6. The remote operation system according to claim 1, wherein the second processor is configured to manage, in a manner associated with each other, the respective external hardware devices and remote operation contents notified by one or more of the first processor, and is configured to activate the in-terminal server when the remote operation contents managed in the manner associated with the external hardware devices are notified by the first processor.

7. The remote operation system according to claim 1, wherein in response to an interrupt operation for the communication device before completion of the operation of the internal function processing unit according to the remote operation content for the communication device stored in the storage, the second processor is configured to deactivate the in-terminal server and executes the interrupt operation.

8. The remote operation system according to claim 1, wherein
in response to the in-terminal server being deactivated before completion of the operation of the internal function processing unit according to the remote operation content for the communication device stored in the storage, the storage is configured to store remote operation contents completed by a time when the in-terminal server is deactivated, and
the first processor is configured to skip notification of the completed remote operation contents in response to the in-terminal server being reactivated.

9. The remote operation system according to claim 1, further comprising a relay server,
wherein the relay server comprises the relay.

10. The remote operation system according to claim 1, wherein the external hardware device comprises the relay.

11. A remote operation method in a remote operation system including communication devices; an external device configured to accept an input of a remote operation content to be executed for the communication device; and a relay device configured to relay communication between the specified communication device and the external device, the remote operation method comprising:
specifying, in the external device, at least one communication device as a target for a remote operation among the communication devices, and accepting an input of a remote operation content to be executed for the specified communication device;
storing, in the relay device, the remote operation content accepted by the external device, and notifying the specified communication device of the remote operation content;
determining, in the communication device, whether an in-terminal server is in an activated state without user input, and accepting a notification from the remote operation content in response to the in-terminal server being in the activated state; and
starting processing of an internal function according to the remote operation content,
wherein the in-terminal server is deactivated upon completion of the internal function according to the remote operation content for the communication device, and
wherein in response to an interrupt operation for the communication device before completion of processing of the internal function according to the remote operation content for the communication device, execution of the interrupt operation is delayed until the in-terminal server is deactivated.

12. The remote operation method according to claim 11, further comprising rejecting, in the relay device, storage or notification of the remote operation content in response to the remote operation content accepted by the external device being an operation content that is not authorized by the external device.

13. The remote operation method according to claim 11, further comprising notifying, in the communication device, the relay device that the in-terminal server is activated.

14. The remote operation method according to claim 11, further comprising activating, in the communication device, the in-terminal server in response to an activation instruction from a user.

15. The remote operation method according to claim 11, further comprising activating, in the communication device, the in-terminal server at a preset timing.

16. The remote operation method according to claim 11, wherein the respective external devices and remote operation contents notified by one or more of a notification unit are managed in a manner associated with each other, and the in-terminal server is activated upon notification of the remote operation contents managed in the manner associated with the external devices in the notifying the remote operation content of the relay device.

17. The remote operation method according to claim 11, wherein in response to an interrupt operation for the communication device before completion of processing of the internal function according to the remote operation content for the communication device, the in-terminal server is deactivated and the interrupt operation is executed.

18. The remote operation method according to claim 11, wherein in response to the in-terminal server being deactivated before completion of processing of the internal function according to the remote operation content for the communication device, remote operation contents completed by a time in response to the in-terminal server being deactivated is stored in the relay device, and notification of the completed remote operation contents is skipped when the in-terminal server is reactivated.

* * * * *